United States Patent
Deery et al.

(10) Patent No.: US 9,714,639 B2
(45) Date of Patent: Jul. 25, 2017

(54) POOL CLEANER GENERATOR MODULE WITH MAGNETIC COUPLING

(71) Applicants: Brian Deery, Sanford, NC (US); Suresh C. Gopalan, Cary, NC (US)

(72) Inventors: Brian Deery, Sanford, NC (US); Suresh C. Gopalan, Cary, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 14/018,359

(22) Filed: Sep. 4, 2013

(65) Prior Publication Data

US 2014/0184065 A1 Jul. 3, 2014

Related U.S. Application Data

(60) Provisional application No. 61/696,746, filed on Sep. 4, 2012.

(51) Int. Cl.
| | |
|---|---|
| *F03B 13/10* | (2006.01) |
| *E04H 4/16* | (2006.01) |
| *F21L 13/02* | (2006.01) |
| *H02K 7/11* | (2006.01) |
| *H02K 7/18* | (2006.01) |

(52) U.S. Cl.
CPC .......... *F03B 13/10* (2013.01); *E04H 4/1654* (2013.01); *F21L 13/02* (2013.01); *H02K 7/11* (2013.01); *H02K 7/1823* (2013.01)

(58) Field of Classification Search
CPC ...................................................... F03B 13/10
USPC ............................................ 290/52; 310/104
See application file for complete search history.

(56) References Cited

U.S. PATENT DOCUMENTS

| | | | |
|---|---|---|---|
| 1,566,872 A | * | 12/1925 | Ishizaka ......................... 290/52 |
| 2,436,683 A | | 2/1948 | Wood, Jr. |
| 3,845,291 A | | 10/1974 | Portyrata |
| 3,913,399 A | | 10/1975 | Sheeks |
| 4,115,040 A | * | 9/1978 | Knorr ........................... 417/420 |
| 4,207,485 A | * | 6/1980 | Silver ........................... 310/104 |
| 4,367,413 A | * | 1/1983 | Nair ............................... 290/52 |
| 4,746,808 A | | 5/1988 | Kaeser |

(Continued)

FOREIGN PATENT DOCUMENTS

| | | | |
|---|---|---|---|
| DE | 4124154 A1 | * | 1/1993 |
| JP | 04334770 A | * | 11/1992 |

(Continued)

*Primary Examiner* — Tulsidas C Patel

(74) *Attorney, Agent, or Firm* — Quarles & Brady LLP

(57) ABSTRACT

Some embodiments provide a pool cleaner generator module with magnetic coupling. The generator module can include a housing, a paddle wheel, a magnetic follower, and a generator. The generator can power components of the pool cleaner, such as light emitting diode (LEDs). The housing can be removably coupled to the pool cleaner and can include a flow directing portion positioned in a fluid path of the pool cleaner. The paddle wheel can be located adjacent to the flow directing portion and can rotate in response to fluid flow through the fluid path. The generator can be magnetically coupled to the paddle wheel and can generate power through rotation of the paddle wheel. The LED can be coupled to the generator and can receive the generated power from the generator to illuminate an area adjacent to the pool cleaner.

21 Claims, 17 Drawing Sheets

(56) References Cited

U.S. PATENT DOCUMENTS

| | | | |
|---|---|---|---|
| 4,920,465 A | 4/1990 | Sargent | |
| 5,228,964 A | 7/1993 | Middleby | |
| 5,435,031 A * | 7/1995 | Minami et al. | 15/1.7 |
| 5,507,058 A * | 4/1996 | Minami et al. | 15/1.7 |
| 5,569,371 A | 10/1996 | Perling | |
| 5,617,600 A | 4/1997 | Frattini | |
| 5,622,422 A | 4/1997 | Rodgers | |
| 5,788,850 A | 8/1998 | Tuomey | |
| 6,011,334 A | 1/2000 | Roland | |
| 6,036,333 A | 3/2000 | Spiller | |
| 6,206,547 B1 | 3/2001 | Erlich | |
| 6,213,623 B1 | 4/2001 | Campman | |
| 6,280,611 B1 | 8/2001 | Henkin et al. | |
| 6,294,084 B1 | 9/2001 | Henkin et al. | |
| 6,398,878 B1 | 6/2002 | Henkin et al. | |
| 6,412,133 B1 | 7/2002 | Erlich et al. | |
| 6,485,638 B2 | 11/2002 | Henkin et al. | |
| 6,502,269 B1 | 1/2003 | Balchan et al. | |
| 6,559,553 B2 | 5/2003 | Yumita et al. | |
| 6,652,742 B2 | 11/2003 | Henkin | |
| RE38,479 E | 3/2004 | Henkin et al. | |
| 6,758,226 B2 * | 7/2004 | Porat | 134/56 R |
| 6,798,080 B1 | 9/2004 | Baarman et al. | |
| 6,842,931 B2 | 1/2005 | Porat et al. | |
| 6,885,114 B2 | 4/2005 | Baarman et al. | |
| 6,927,501 B2 | 8/2005 | Baarman et al. | |
| 6,965,814 B2 | 11/2005 | Hadari | |
| 7,060,182 B2 | 6/2006 | Erlich et al. | |
| 7,119,451 B2 | 10/2006 | Baarman et al. | |
| 7,143,502 B2 | 12/2006 | Porat et al. | |
| 7,165,284 B2 | 1/2007 | Erlich et al. | |
| 7,233,078 B2 | 6/2007 | Baarman et al. | |
| 7,235,894 B2 | 6/2007 | Roos | |
| 7,385,303 B2 | 6/2008 | Roos | |
| 7,462,945 B2 | 12/2008 | Baarman et al. | |
| 7,528,514 B2 | 5/2009 | Cruz et al. | |
| 7,543,607 B2 | 6/2009 | Henkin et al. | |
| 7,608,936 B2 | 10/2009 | Shimizu et al. | |
| 7,621,014 B2 | 11/2009 | Katz | |
| 7,663,257 B2 | 2/2010 | Baarman et al. | |
| 7,690,066 B2 | 4/2010 | Stoltz et al. | |
| 7,701,076 B2 | 4/2010 | Baarman et al. | |
| 7,723,860 B2 | 5/2010 | Nagler | |
| 7,723,934 B2 | 5/2010 | Adam et al. | |
| 7,768,147 B2 | 8/2010 | Baarman et al. | |
| 7,812,470 B2 | 10/2010 | Baarman et al. | |
| 7,845,820 B2 | 12/2010 | Bertken | |
| 7,900,308 B2 | 3/2011 | Erlich et al. | |
| 7,956,480 B2 | 6/2011 | Onodera et al. | |
| 7,956,481 B2 | 6/2011 | Baarman et al. | |
| 8,007,653 B2 | 8/2011 | Porat | |
| 8,092,675 B2 | 1/2012 | Kennedy | |
| 8,141,191 B2 | 3/2012 | Hui | |
| 8,266,752 B2 | 9/2012 | Henkin et al. | |
| 8,294,290 B2 * | 10/2012 | da Silva | 290/52 |
| 8,341,789 B2 | 1/2013 | Garti | |
| 8,397,330 B2 | 3/2013 | Pichon et al. | |
| 8,434,182 B2 | 5/2013 | Horvath et al. | |
| 8,618,687 B2 | 12/2013 | Burnham | |
| 8,661,595 B2 | 3/2014 | Bernini | |
| 8,752,226 B2 | 6/2014 | Erlich et al. | |
| 8,836,191 B2 * | 9/2014 | Adachi et al. | 310/103 |
| 9,062,473 B2 | 6/2015 | Erlich | |
| 9,097,234 B2 * | 8/2015 | Breau | F03B 13/10 |
| 9,119,463 B2 | 9/2015 | Gopalan et al. | |
| 9,133,639 B2 | 9/2015 | Ben-Dov et al. | |
| 9,259,130 B2 * | 2/2016 | Deery | A47L 9/30 |
| 2004/0025268 A1 * | 2/2004 | Porat et al. | 15/1.7 |
| 2004/0040581 A1 | 3/2004 | Bruwer | |
| 2006/0053572 A1 | 3/2006 | Porat | |
| 2006/0226060 A1 | 10/2006 | Mercer | |
| 2007/0094817 A1 * | 5/2007 | Stoltz et al. | 15/1.7 |
| 2009/0307854 A1 * | 12/2009 | Garti | 15/1.7 |
| 2010/0157582 A1 | 6/2010 | Bertken | |
| 2010/0327591 A1 * | 12/2010 | Dick et al. | 290/52 |
| 2011/0057456 A1 * | 3/2011 | Atallah et al. | 290/1 C |
| 2012/0110727 A1 | 5/2012 | Uy et al. | |
| 2014/0096329 A1 * | 4/2014 | Garti et al. | 15/1.7 |
| 2014/0230168 A1 | 8/2014 | Ben Dov et al. | |
| 2014/0259465 A1 | 9/2014 | van Der Meijden | |
| 2014/0262997 A1 | 9/2014 | Renaud et al. | |
| 2014/0303810 A1 | 10/2014 | van Der Meijden et al. | |
| 2015/0292222 A1 | 10/2015 | Tamar et al. | |

FOREIGN PATENT DOCUMENTS

| | | | |
|---|---|---|---|
| SU | 1206560 A * | 1/1986 | |
| WO | 2007036943 | 4/2007 | |
| WO | WO 2014039577 A2 * | 3/2014 | E04H 4/1654 |

* cited by examiner

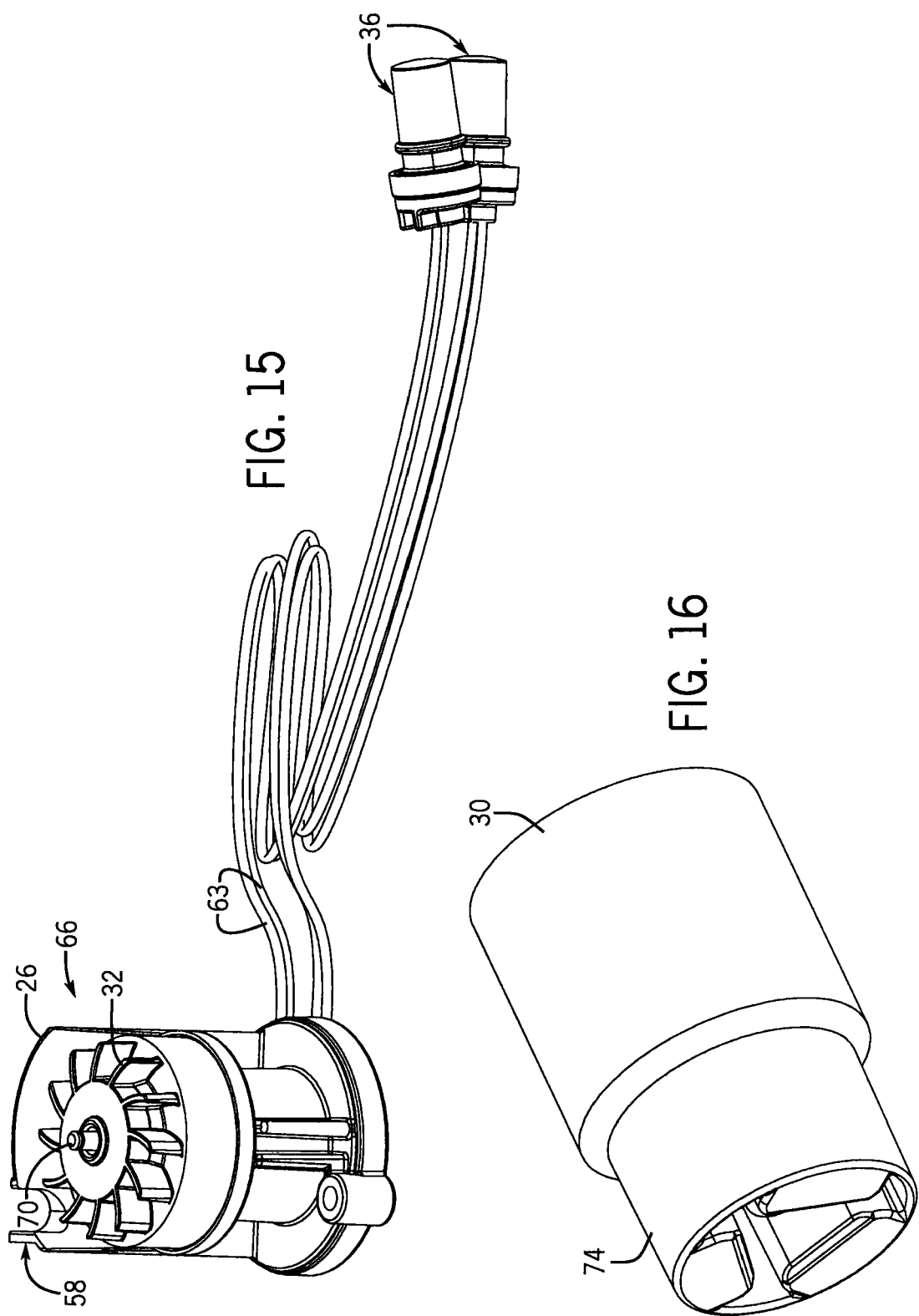

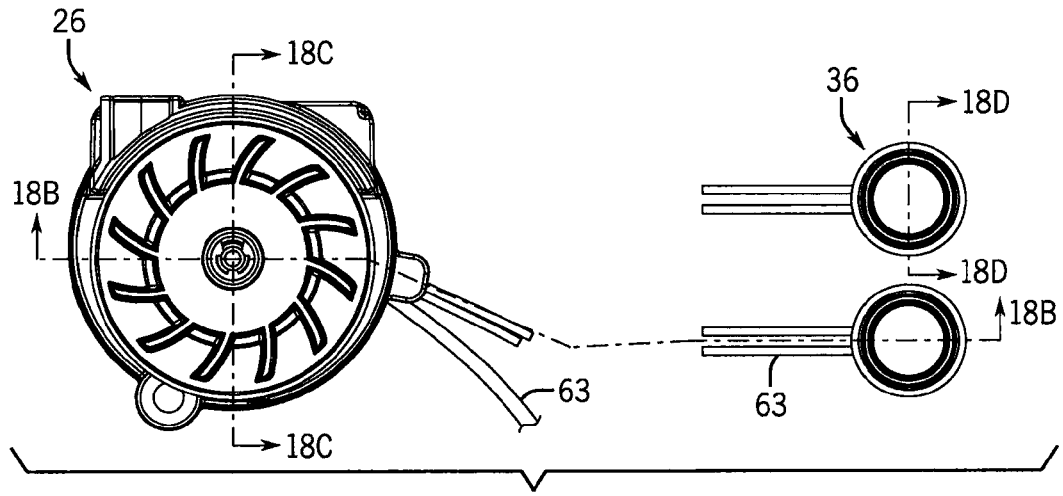
FIG. 18A
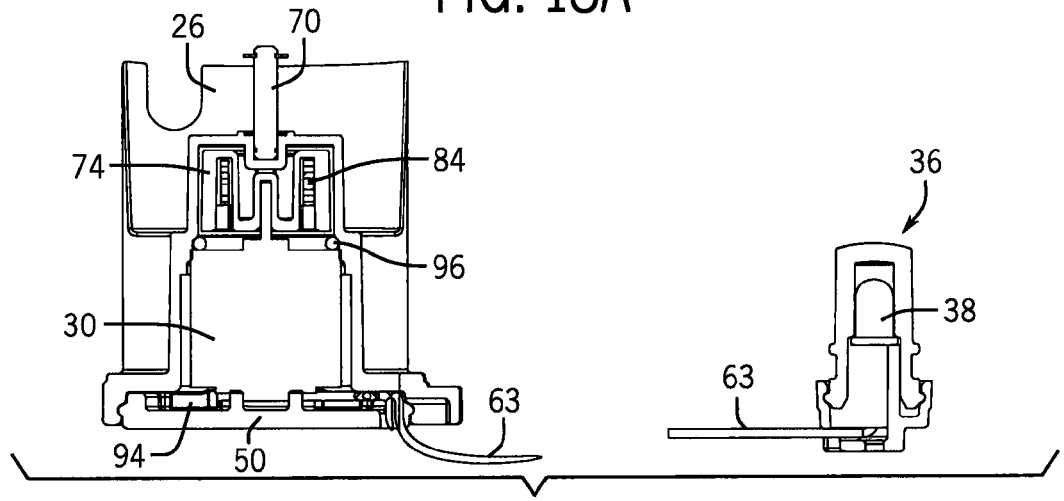
FIG. 18B
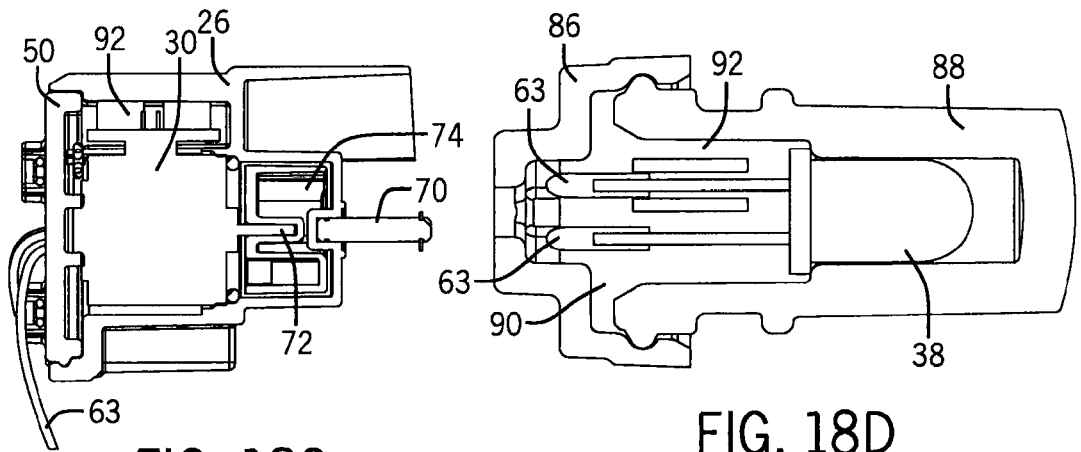
FIG. 18C
FIG. 18D

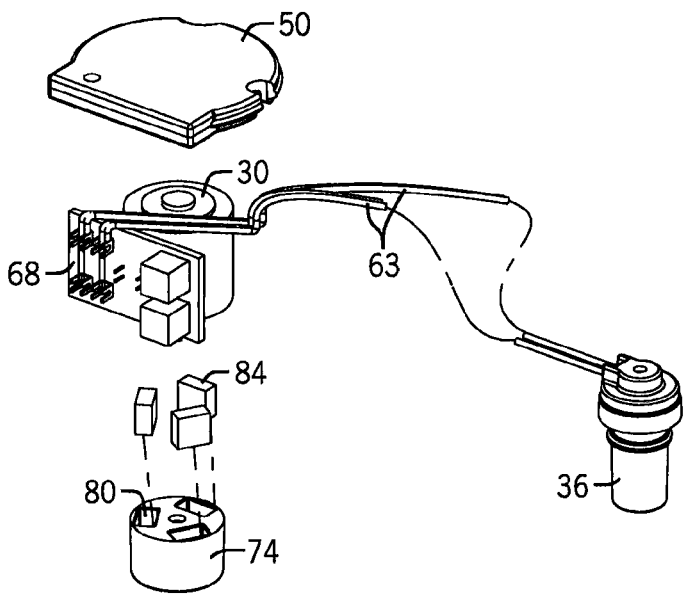
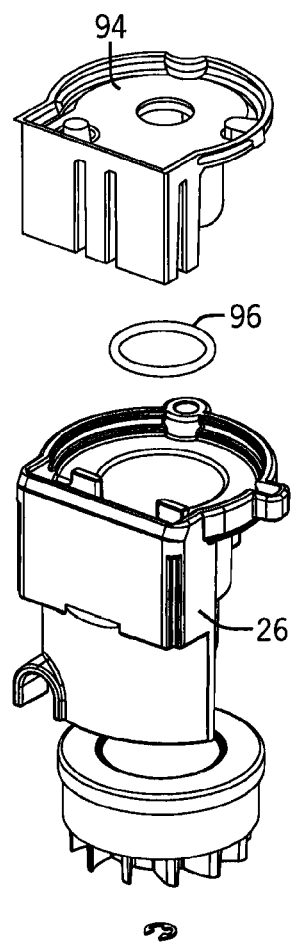
FIG. 19A

POOL CLEANER GENERATOR MODULE WITH MAGNETIC COUPLING

RELATED APPLICATIONS

This application claims priority under 35 U.S.C. §119 to U.S. Provisional Patent Application No. 61/696,746 filed on Sep. 4, 2013, the entire contents of which are incorporated herein by reference.

BACKGROUND

Automatic swimming pool cleaners include components for driving the pool cleaners along the floor and sidewalls of a swimming pool, either in a random or deliberate manner, to vacuum debris on and adjacent to the floor and sidewalls. For example, conventional pressure side cleaners and suction cleaners often use hydraulic turbine assemblies as drive systems to drive one or more wheels. Robotic cleaners often include a motor or other mechanical system powered by an external power source to drive one or more wheels.

Although automatic swimming pool cleaners operate with little manual operator interaction, it is sometimes difficult for the operator to quickly determine whether the pool cleaner is operating correctly or efficiently. For example, an operator can see the pool cleaner moving along a swimming pool floor, but not realize that the cleaner is not vacuuming or barely vacuuming until hours or days later when a substantial amount of debris has settled on the pool floor. This may be due to mechanical malfunctions in robotic cleaners, or insufficient suction or pressure in suction-driven or pressure-driven pool cleaners.

Furthermore, an operator must wait to watch whether a pool cleaner is moving to determine if it is operating. If the pool cleaner is scheduled to operate at night, the operator must turn on lights inside or around the swimming pool to see if the pool cleaner is operating. This can be a tedious task that many operators do not pay attention to and, as a result, these operators do not realize their pool cleaner has not been operating until a substantial amount of debris has settled on the pool floor.

SUMMARY

Some embodiments of the invention provide a generator module for a swimming pool cleaner. The generator module can include a generator in conjunction with a paddle wheel and a magnetic coupler and can be used to power components of the pool cleaner, such as LEDs. The LEDs can provide functional and aesthetic uses by illuminating the pool cleaner surroundings, highlighting debris within the swimming pool, and/or conveying information related to the pool cleaner back to a user or operator (for example to indicate when a debris bag is full or to indicate pool chemistry). Other components powered by the generator can include a computer, controller, sensors, actuators, and/or an ozone generator of the pool cleaner.

According to one embodiment, a generator module for a swimming pool cleaner includes an outer housing having a flow directing portion positioned in a fluid flow path of the swimming pool cleaner. A paddle wheel is positioned adjacent a driven shaft and includes a magnet section having at least one dive magnet and rotates in response to fluid flow through the fluid path. A generator is positioned inside of the outer housing and in communication with the driven shaft. A magnetic follower is positioned around the driven shaft and further includes at least one follower magnet, wherein the magnet section of the paddle wheel substantially encircles the magnetic follower. The at least one drive magnet of the paddle wheel is magnetically coupled to the at least one follower magnet of the magnetic follower such that rotation of the paddle wheel causes rotation of the magnetic follower.

According to another embodiment, a generator module for a swimming pool cleaner includes an outer housing having a flow directing portion positioned in a fluid flow path of the swimming pool cleaner and a paddle wheel positioned over a drive shaft. The paddle wheel includes magnets embedded therein. An array of coils are situated around the paddle wheel, wherein the array of coils can observe an alternating magnetic field when the paddle wheel rotates. The module further includes a device for converting the alternating magnetic field into alternating electric current and electronic circuitry that is driven by the alternating electric current.

According to a different embodiment, a method of operating a pool cleaner includes the steps of receiving fluid flow through an opening in the pool cleaner and generating electric power using a paddle wheel positioned to receive at least some of the fluid flow and a generator magnetically coupled to the paddle wheel. The method further includes the step of determining a pressure of the fluid flow. At least one light emitting diode is operated using the generated electric power according to a first operation if the pressure is sufficient for normal operation of the pool cleaner and the at least one light emitting diode is operated using the generated electric power according to a second operation if the pressure is insufficient for normal operation of the pool cleaner.

DESCRIPTION OF THE DRAWINGS

FIG. 15 is a perspective view of a magnetically coupled generator module according to one embodiment of the invention.

FIG. 16 is a side view of a generator and a magnetic follower for use with the magnetically coupled generator module of FIG. 15.

FIG. 18A is a cross-sectional view of a magnetically coupled generator module according to one embodiment of the invention.

FIG. 18B is a cross-sectional view of the magnetically coupled generator module of FIG. 18A taken generally along the line 18B-18B of FIG. 18A.

FIG. 18C is a cross-sectional view of the magnetically coupled generator module of FIG. 18A taken generally along the line 18C-18C of FIG. 18A.

FIG. 18D is a cross-sectional view of the magnetically coupled generator module of FIG. 18A taken generally along the line 18D-18D of FIG. 18A.

FIG. 19A is an exploded view of the magnetically coupled generator of FIG. 18.

DETAILED DESCRIPTION

Figure 1:
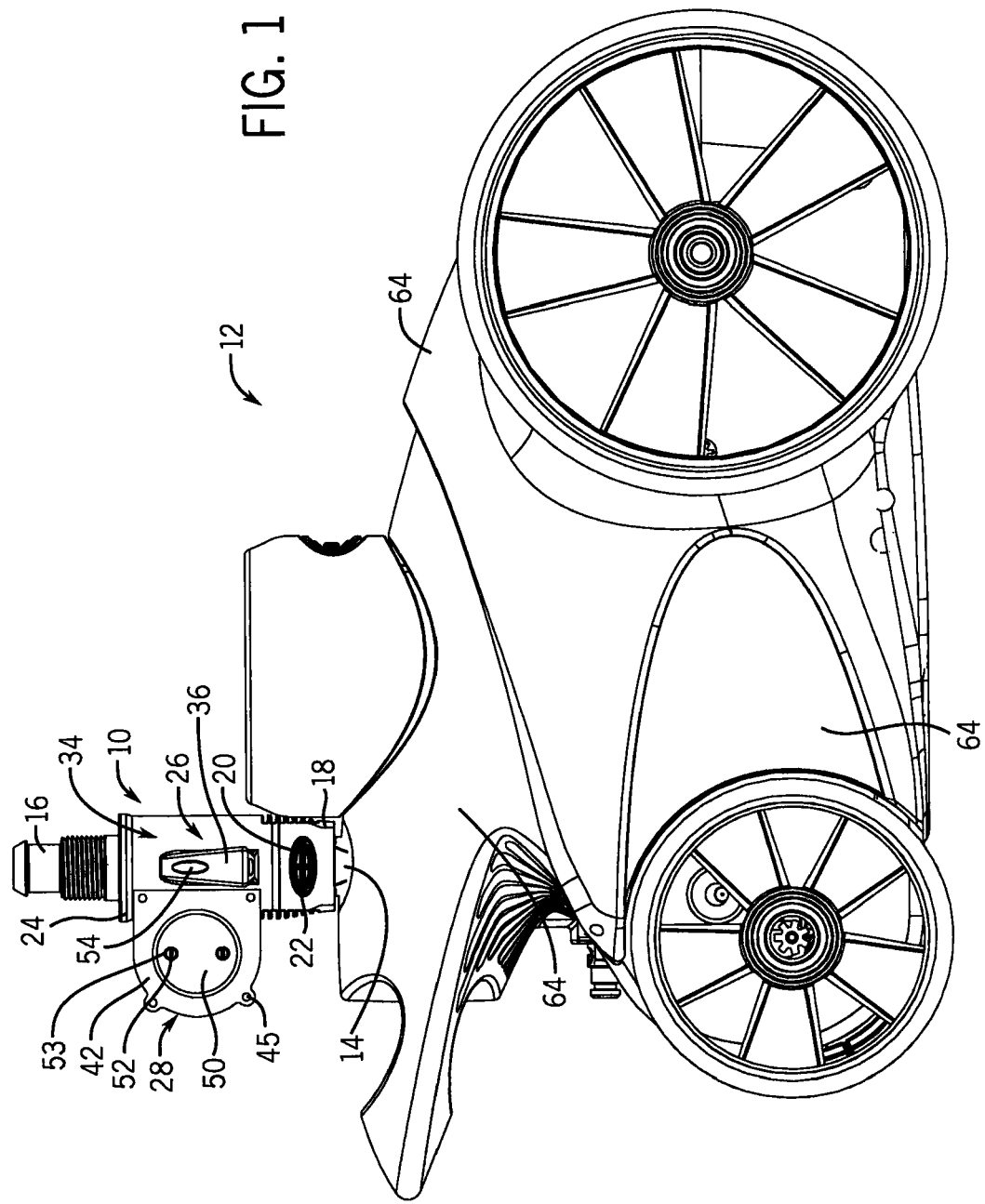
FIG. 1 is a side view of an in-line light emitting diode (LED) module, according to one embodiment of the invention, coupled to a pool cleaner.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
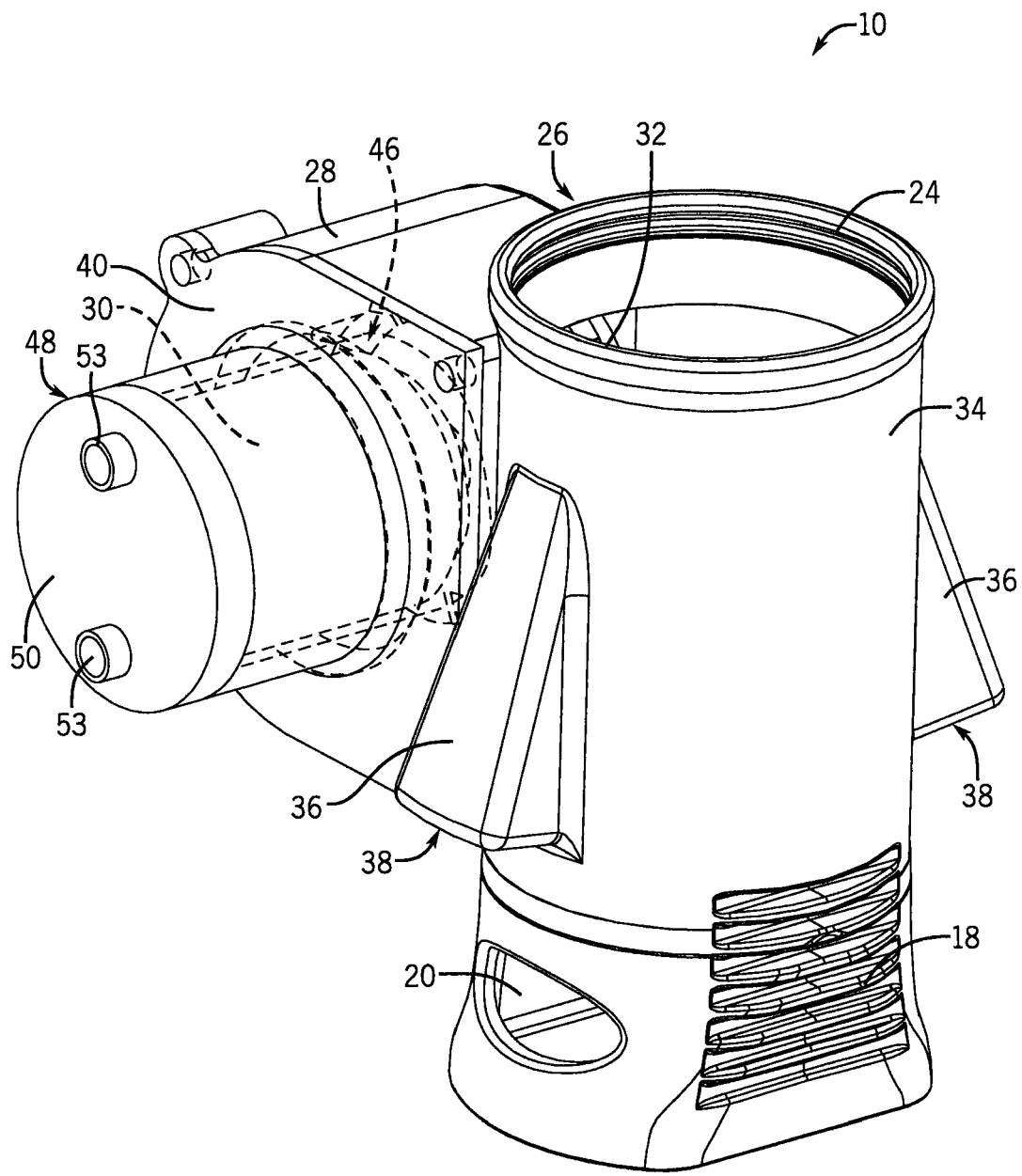
FIG. 2 is a perspective view of the in-line LED module of FIG. 1.
Figure 3:
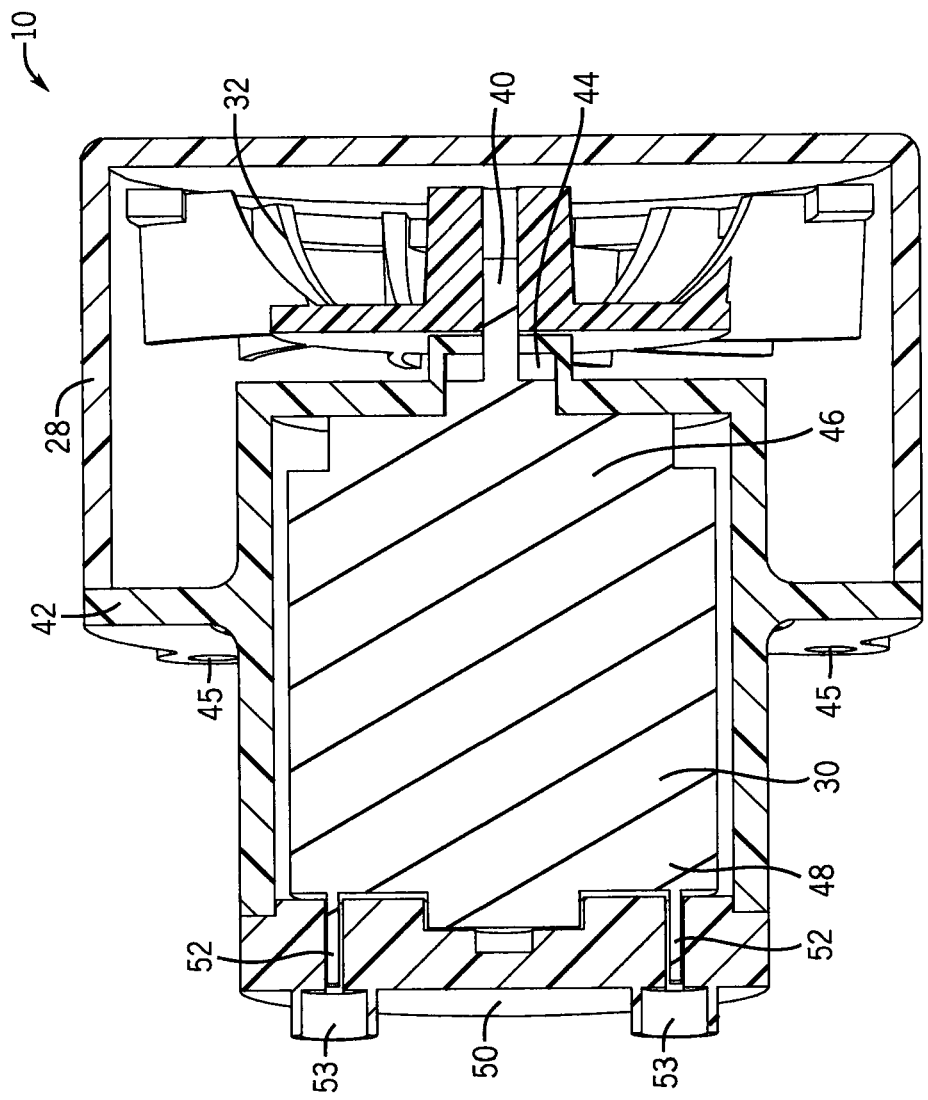
FIG. 3 is a perspective cross-sectional view of the in-line LED module of FIG. 1.
Figure 4:
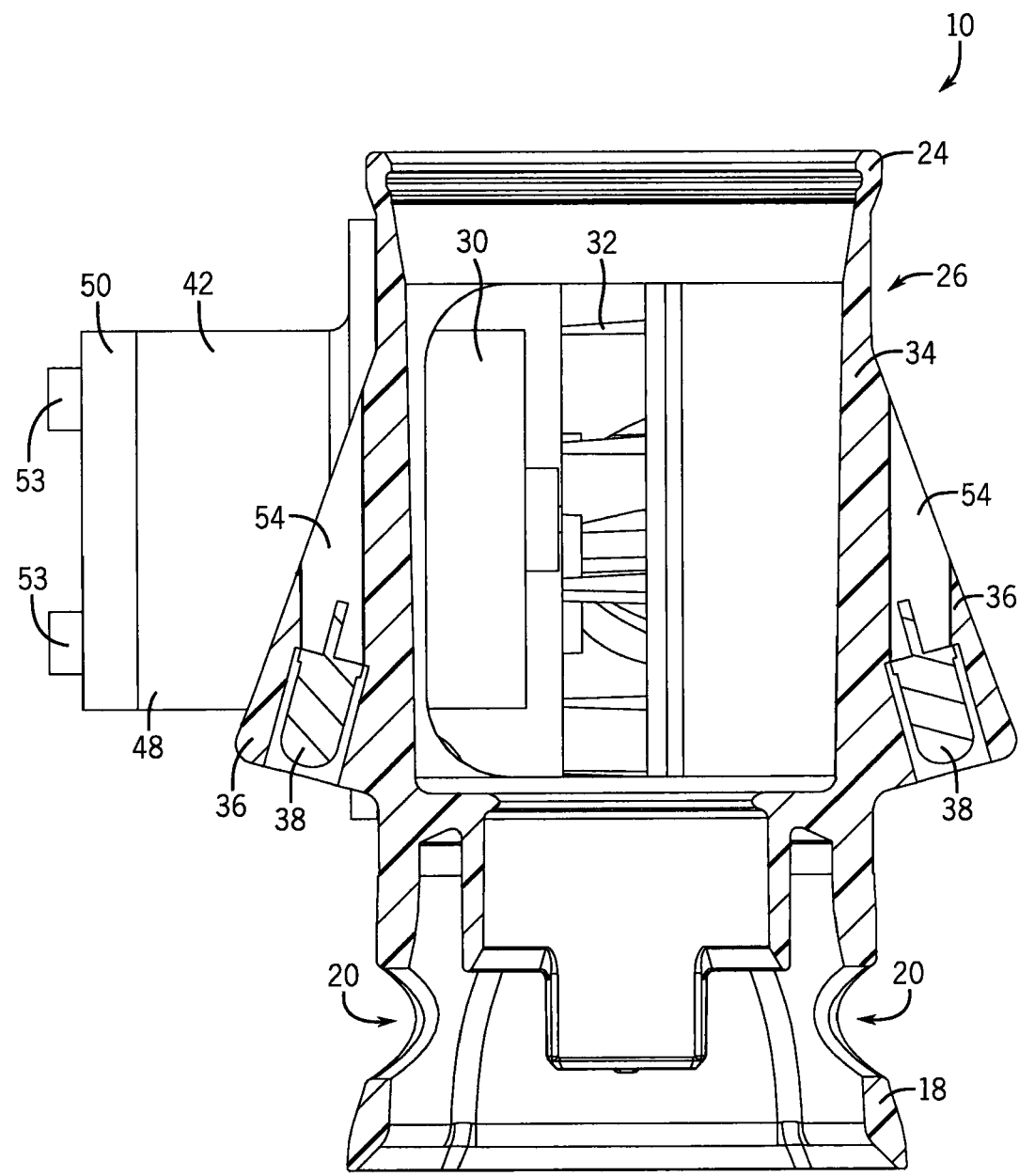
FIG. 4 is a side cross-sectional view of the in-line LED module of FIG. 1.
Figure 7:
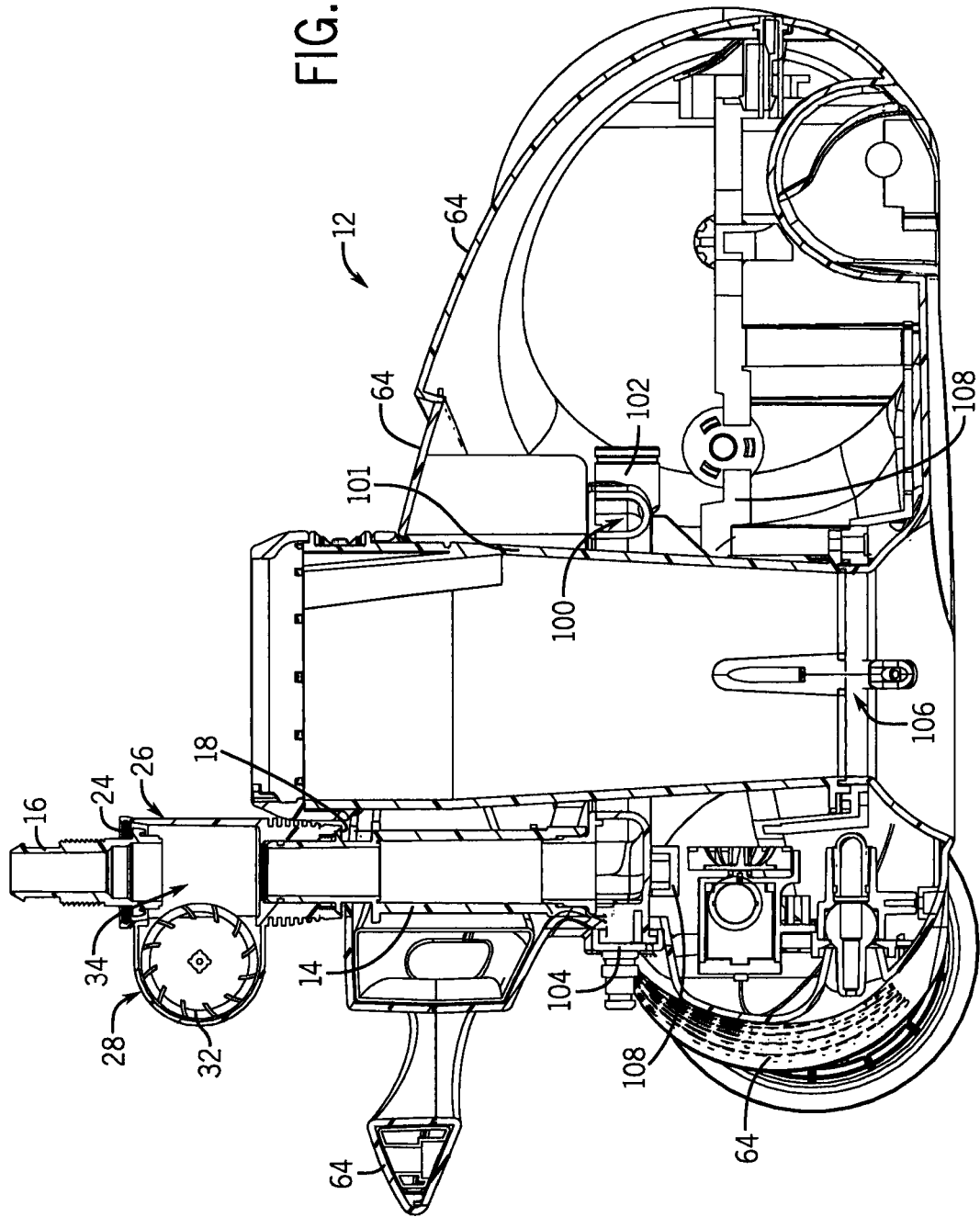
FIG. 7 is a side cross-sectional view of the in-line LED module and the pool cleaner of FIG. 1.
Figure 8:
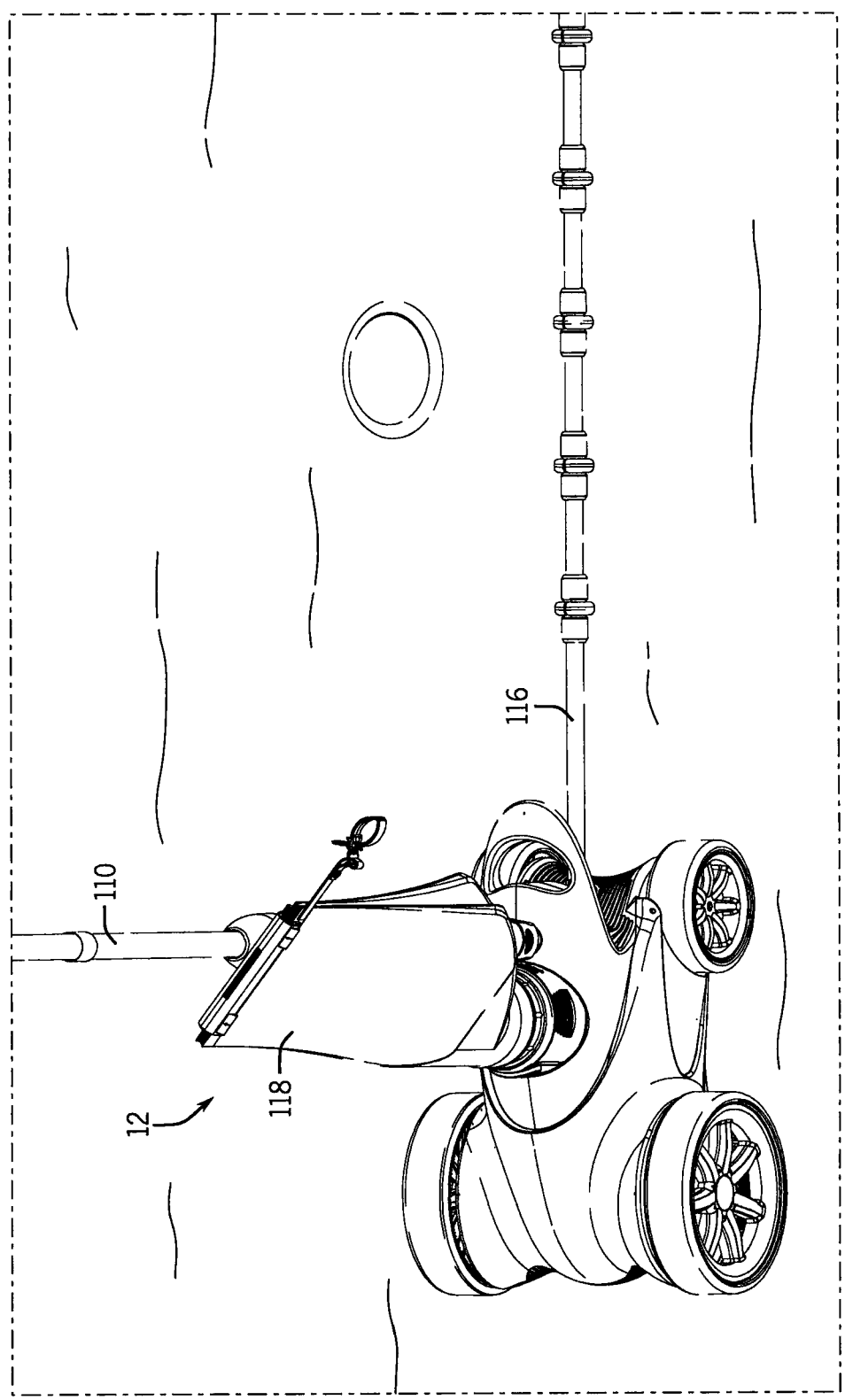
FIG. 8 is a perspective view of a pool cleaner connected to a pool hose.

FIG. 1 illustrates an in-line light emitting diode (LED) module 10, according to one embodiment of the invention, for use with a pool cleaner 12 in a swimming pool or spa system. The in-line LED module 10 can be positioned along a fluid path of the pool cleaner 12, for example between a supply mast 14 of the swimming pool cleaner 12 and a pool hose attachment adapter 16. As shown in FIGS. 1 and 2, a bottom portion 18 of the in-line LED module 10 can be coupled to the supply mast 14, for example, through a snap-fit connection between through-holes 20 in the bottom portion 18 and extension portions 22 of the supply mast 14. A top portion 24 of the in-line LED module 10 can be coupled to the pool hose attachment adapter 16, for example, by a friction fit. The pool hose attachment adapter 16 can receive a pool hose 110 (as shown in FIG. 8) in fluid communication with a filter pump or a booster pump of the pool or spa system to supply water to the pool cleaner 12. The in-line LED module 10 can include an outer housing 26 with a paddle wheel housing 28, a generator 30, a paddle wheel 32 (as shown in FIGS. 3, 4 and 7), and a tube housing 34. The tube housing 34 can include the bottom portion 18 and the top portion 24, described above, as well as LED housings 36 that at least partially enclose one or more LEDs 38.

In one embodiment, the pool cleaner 12 can be a pressure-driven pool cleaner. As a result, water from the filter pump or the booster pump is driven through the pool hose 110 and into a fluid path of the pool cleaner 12 in order to operate the pool cleaner 12. More specifically, water is driven through the pool hose 110, the hose attachment adapter 16, the tube housing 34 of the in-line LED module 10, and into the supply mast 14. The paddle wheel 32 is substantially positioned within the paddle wheel housing 28 and extends into the tube housing 34. The tube housing 34 acts as a flow-directing portion of the in-line LED module 10 to provide fluid flow from the pool hose 110 to the supply mast 14 and across the paddle wheel 32. Thus, when water flows through the tube housing 34, the paddle wheel 32 is rotated. The paddle wheel 32 is coupled to the generator 30 (e.g., a shaft 40 of the generator 30 is connected to the paddle wheel 32) so that rotation of the paddle wheel 32 hydraulically causes the generator 30 to produce electric power for operating the LEDs 38 and their related circuitry.

As shown in FIG. 3, the generator 30 can be housed within a generator housing 42 that extends into the paddle wheel housing 28. A rubber seal ring 44 can be positioned between a first side 46 of the generator 30 and the paddle wheel 32 (e.g., inside the generator housing 42) to prevent water flow through the tube housing 34 and the paddle wheel housing 28 from reaching the generator 30. The generator housing 42 and the paddle wheel housing 28 can include mating holes 45 for receiving fasteners to couple together the generator housing 42 and the paddle wheel housing 28 and to allow easy removal of the generator 30 for replacement or repair. A second, opposite side 48 of the generator 30 can be enclosed within the generator housing 42 by a lead cover 50, as shown in FIG. 2. As shown in FIG. 3, the lead cover 50 can allow exposure of one or more leads 52 from the generator 30 through lead openings 53. Lead cables (not shown) can electrically connect the leads 52 through the generator housing 42 to the LEDs 38 in order to provide power to the LEDs 38. For example, the lead cables can be routed through access holes 54 in the LED housings 36, as shown in FIGS. 1 and 4.

As shown in FIG. 4, the LEDs 38 can be positioned generally downward and outward and/or the LED housings 36 can be shaped to generally reflect light from the LEDs 38 in a downward and outward manner in order to illuminate the pool cleaner surroundings (e.g., the pool floor or pool walls near the pool cleaner 12). The LEDs 38 can include internal control circuitry programmed to control the illumination time and/or color of the LEDs 38. In some embodiments, external control circuitry for the LEDs 38 and/or other components of the in-line LED module 10 can be housed within the generator housing 42 and the lead cables can provide both power from the generator 30 and control from the control circuitry to the LEDs 38.

In other embodiments, the LEDs 38 can be positioned to illuminate other areas surrounding the pool cleaner 12. For example, the LEDs 38 can be positioned to illuminate upward and/or outward to convey information to a pool user, such as an indication that the pool cleaner 12 is operating or an amount of time the pool cleaner 12 has been operating or has left to operate (e.g., through color changes, flashing, etc.). The downward-facing LEDs 38, as described above, can also achieve this function of conveying information to the user. In addition, in some embodiments, the pool cleaner 12 can be a vacuum-driven pool cleaner, in which water flow through the fluid path of the pool cleaner 12 is reversed with respect to the pressure-driven pool cleaner embodiment described above. In such embodiments, the in-line LED module 10 operates the same as described above.

Figure 5:
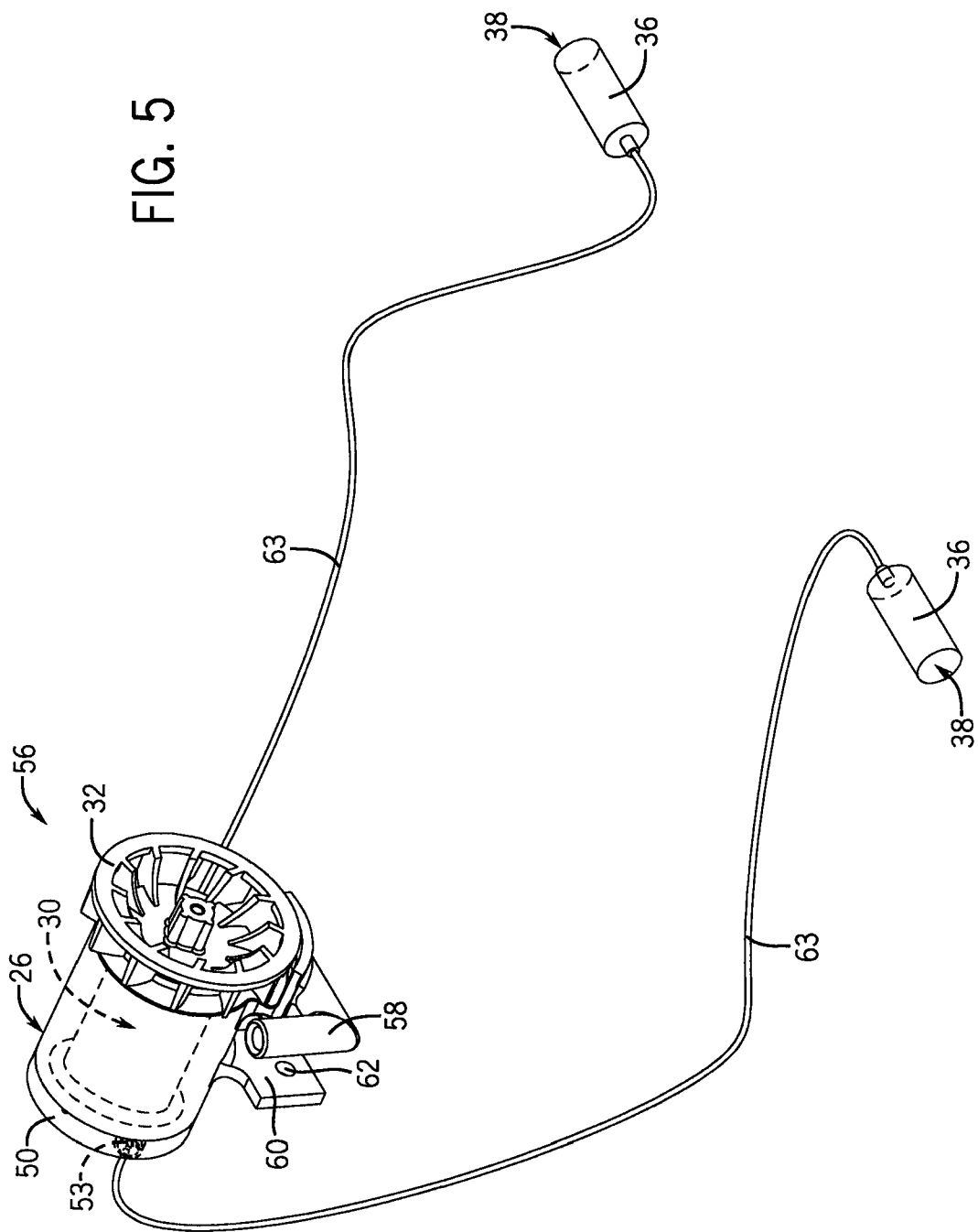
FIG. 5 is a perspective view of an internal LED module according to another embodiment of the invention.

FIG. 5 illustrates an internal LED module 56 according to another embodiment of the invention. The internal LED module 56 can operate similar to the in-line LED module 10 described above and can be positioned inside the pool cleaner 12 and at least partially within the fluid path of the pool cleaner 12. In general, the fluid path of the pool cleaner 12 can include any components in which fluid is directed through the pool cleaner 12, such as the pool hose attachment adapter 16, the supply mast 14, a sweep hose jet, a distributer manifold, thrust jets, a timing assembly, a hydraulic drive wheel assembly, a vacuum assembly, etc.

Figure 6:
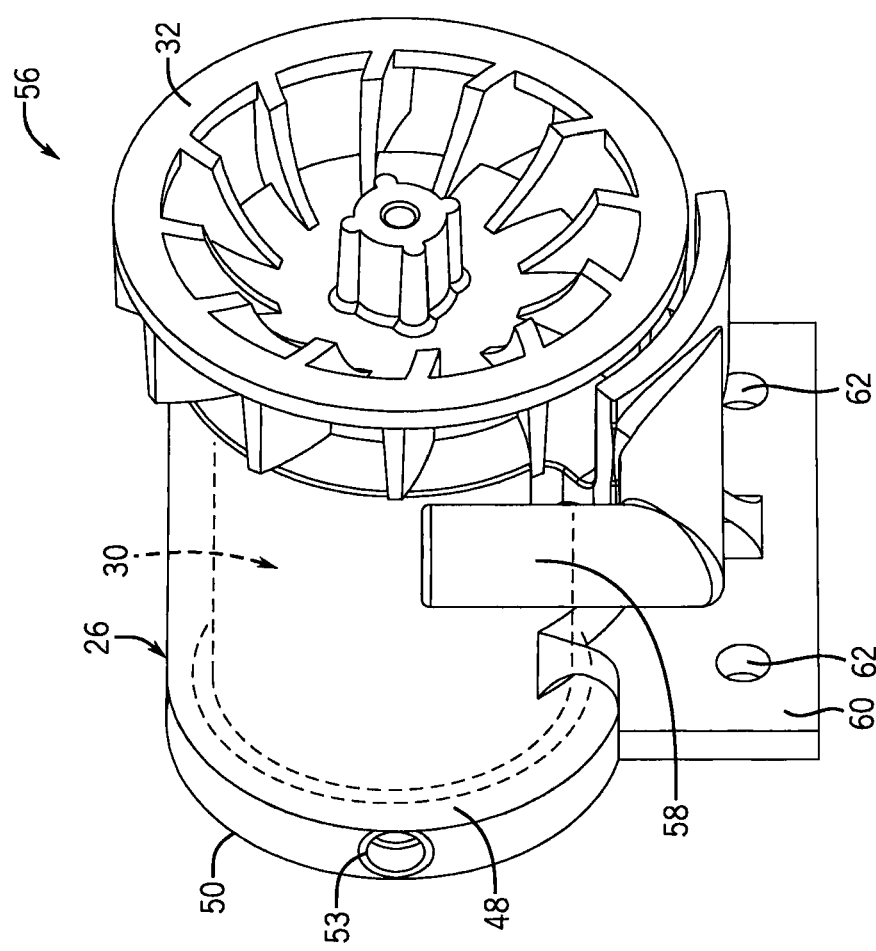
FIG. 6 is a partial perspective view of the internal LED module of FIG. 5.

The internal LED module 56 can include an outer housing 26, a paddle wheel 32, a lead cover 50, lead cables 63, and LEDs 38. The outer housing 26 can house a generator 30, which can be coupled to the paddle wheel 32 via a generator shaft and can be substantially sealed off from the paddle wheel 32 by a seal plate and a rubber seal ring (similar to that shown for the in-line LED module 10 described above). As shown in FIGS. 5 and 6, the outer housing 26 can include a flow director 58 that directs water flow from the fluid path across the paddle wheel 32. As a result, the paddle wheel 32 rotates, causing rotation of the generator shaft to generate power for the LEDs 38.

The internal LED module 56 can be positioned at any location within the pool cleaner 12 so that the flow director 58 enters the fluid path and receives water flow to redirect to the paddle wheel 32. For example, the internal LED module 56 can be positioned within the pool cleaner 12 so that the flow director 58 extends into the supply mast 14 or a distributer manifold 100 of the pool cleaner 12. As shown in FIG. 7, the distributer manifold 100 can substantially encircle a suction mast 101 of the pool cleaner 12 and can receive fluid flow from the supply mast 14. Generally, the fluid path leads from the supply mast 14 to the distributor manifold 100 and the distributor manifold 100 distributes the fluid path of water flow received by the supply mast 14 to various portions of the pool cleaner 12 for operation, such as a fluid outlet 102 for a timer assembly (not shown), a sweep hose jet 104, a vacuum assembly 106, etc. In another example, the internal LED module 56 can be positioned downstream from the distributor manifold 100 (i.e., in comparison to upstream from the distributor manifold 100 near the supply mast 14) and closer to the timer assembly, the sweep hose jet 104, the vacuum assembly 106, or other hydraulically operated assemblies of the pool cleaner 12. The outer housing 26 can include a mounting portion 60 with through holes 62 to allow an operator to couple the internal LED module 56 to a chassis 108 or other component within the pool cleaner 12 using fasteners (not shown).

Referring back to the generator 30 in FIGS. 5 and 6, a second side 48 of the generator 30 can be enclosed in the outer housing 26 by the lead cover 50. The lead cover 50 allows access for the lead cables 63 to connect to leads 52 on the generator 30 (e.g., through lead openings 53 in the lead cover 50). The lead openings 53 can extend from sides of the lead cover 50, as shown in FIGS. 5 and 6, or can extend from a back end of the lead cover 50, as shown in the lead cover 50 of FIGS. 1-4 with respect to the in-line LED module 10. The lead cables 63 can be further connected to the LEDs 38 (e.g., with LED housings 36, as shown in FIGS. 5 and 6) in order to provide power and/or control to the LEDs 38. The LEDs 38 can include control circuitry (e.g., internal control circuitry adjacent to the LEDs 38 and/or external control circuitry housed within the outer housing 26) to control the illumination time and/or color of the LEDs 38.

Figure 9:
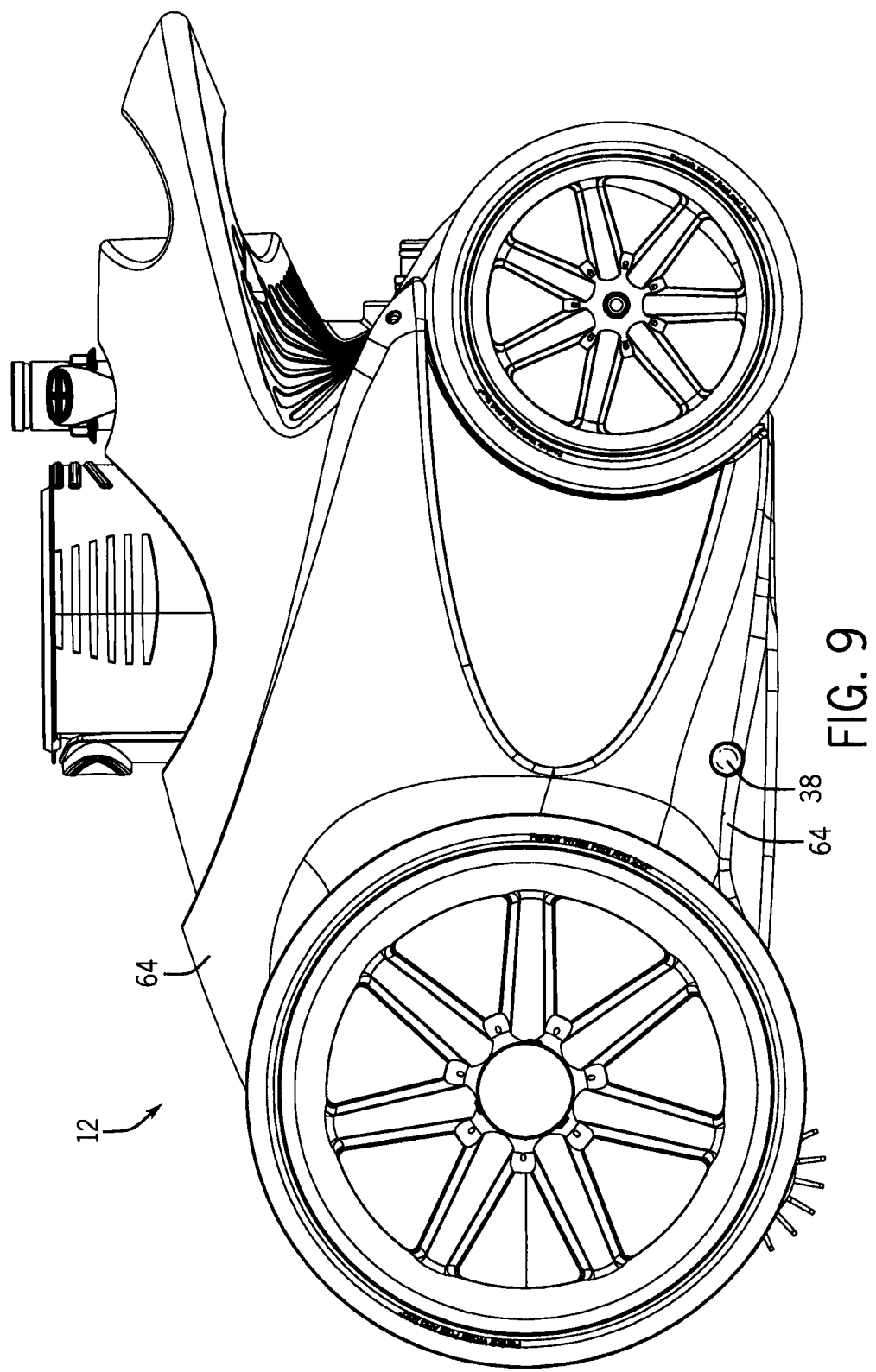
FIG. 9 is a side view of a pool cleaner including side-mounted light emitting diodes.
Figure 10:
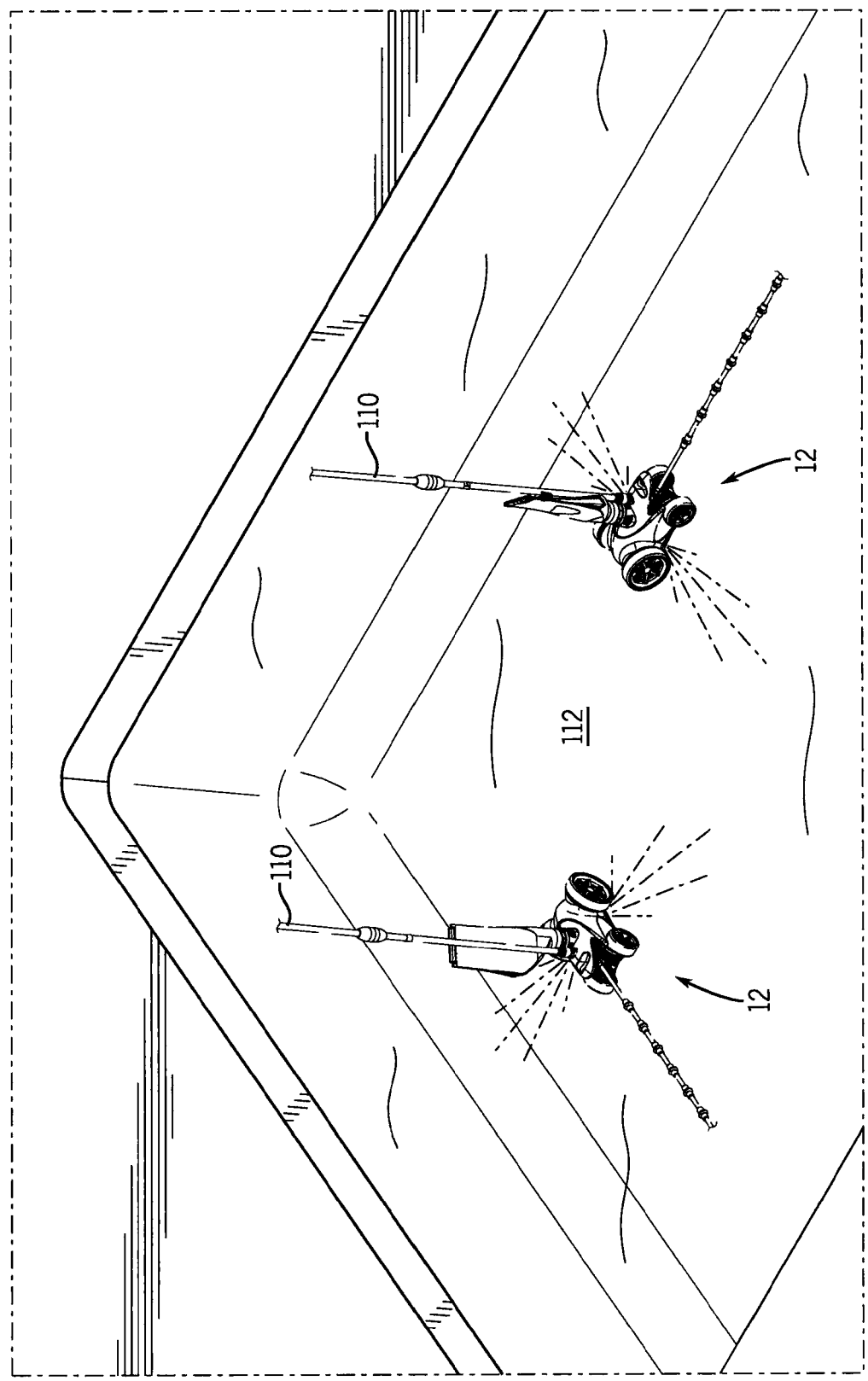
FIG. 10 is a perspective view of two pool cleaners illuminating the floor of a swimming pool.

The LEDs 38 can be positioned at one or more locations along the pool cleaner 12 to illuminate the surrounding area of the pool cleaner 12. For example, the LEDs 38 can be positioned at locations near the bottom sides of the pool cleaner 12, as shown in FIG. 9, to illuminate the pool floor 112 or walls near the pool cleaner 12, as shown in FIG. 10. In another example, the LEDs 38 can be positioned at locations near the front of the pool cleaner 12 to illuminate debris in the path of the pool cleaner 12. In another example, the LEDs 38 can be positioned at locations near the back side of the pool cleaner 12 to illuminate a whiptail or sweeptail 116 trailing the pool cleaner 12 to scrub pool surfaces, as shown in FIG. 8. The LEDs 38 can be positioned substantially outside the pool cleaner 12, or can be at least partially recessed within the pool cleaner 12 and protected by outer covers 64 (as shown in FIGS. 1 and 9) of the pool cleaner 12. In either such embodiment, the outer covers 64 can be removable to allow removal or replacement of the LEDs 38, the lead cables 63, and/or the internal LED module 56.

The above embodiments of LED modules 10, 56 describe illuminating the LEDs 38 when the pool cleaner 12 is in operation through electric power generation when the pool cleaner 12 is receiving water from a pool hose 110. Therefore, the LEDs 38 can provide functional as well as aesthetic uses. More specifically, the illuminated LEDs 38 can provide a quick signal to an operator that the pool cleaner 12 is in operation. In some embodiments, the control circuitry of the LEDs 38 and/or additional control circuitry of the LED modules 10, 56 (such as the external control circuitry in the generator housing 28) can control the color and/or illumination time of the LEDs 38 based on the water pressure entering the pool cleaner 12 for the hydraulically powered LED modules 10, 56. For example, if the pool cleaner 12 is receiving insufficient water pressure, and as a result is not vacuuming properly, the paddle wheel 32 of the LED modules 10, 56 will rotate slower. This event can be communicated to the operator by operating the LEDs 38 with a different color (e.g., green for sufficient flow or movement speed, red for insufficient flow or movement speed) or at a different rate (e.g., constant illumination for sufficient flow or movement speed, flashing for insufficient flow or movement speed).

In addition, the LED control circuitry can operate the LEDs 38 in a single color mode (i.e., where all LEDs 38 illuminate the same color), a multi-color mode (i.e., where different LEDs 38 illuminate different colors, for example where one side of the pool cleaner 12 is illuminated red and the other side of the pool cleaner 12 is illuminated purple), or a color-changing mode (i.e., where the LEDs 38 illuminate a first color for a first time period, then a second color for a second time period, etc.). The color-changing mode may convey to an operator as to when the pool cleaner 12 will be done operating. For example, the LEDs 38 may be illuminated in a first color during most of the pool cleaner operation, and then illuminated in a second color during the last ten minutes of the pool cleaner operation so that the operator knows that the pool cleaner operation is almost completed. Each of the LED modules 10, 56 can be easily removed from the pool cleaner 12 to allow repair or replacement of components, such as LEDs 38, generators 30, etc.

Furthermore, in some embodiments of the invention, the LED modules 10, 56 may be capable of connecting to a power supply and/or a controller (not shown) of the pool cleaner 12. In some embodiments, the power supply can assist powering the LEDs 38, while the controller can provide additional information about the pool cleaner 12 in order to illuminate the LEDs 38 in accordance with other operations of the pool cleaner 12. For example, the pool cleaner controller can include a sensor to determine when a debris bag 118, as shown in FIG. 8, needs to be emptied. The pool cleaner controller can communicate this needed action to the LED control circuitry, and the LED control circuitry can illuminate the LEDs 38 in a manner to alert the operator of the needed action. In addition, in some embodiments, the LED modules 10, 56 can provide power to the power supply and/or the controller. By connecting to the power supply and/or the controller, the LED modules 10, 56 can help power additional components of the pool cleaner 12, such as timing machinery, valves, sensors, actuators, etc. In one example, the LED modules 10, 56 can power, or assist in powering, an ozone generator (not shown) of the pool cleaner 12.

The LED modules 10, 56 described above include a generator 30 directly coupled to a paddle wheel 32 by a shaft 40 extending through a housing 26/42. The housing 26/42 is sealed from water intrusion by a rubber seal ring 44 surrounding the shaft 40, therefore protecting the generator 30 from getting wet. Generally, where two pieces of material (i.e., the shaft 40 and the rubber seal ring 44) are moving against each other, friction and wear can be designed for. However, after enough wear or with enough pressure, the previously watertight seal between the two pieces will leak. With this seal being the only barrier between the generator 30 and/or other electronics within the housing 26/42 and the water, a single drop of leakage may be enough to destroy the LED module 10, 56. For example, water leakage inside the housing 26/42 can cause the generator 30 to corrode and fail.

Another issue with the shaft and seal design, in addition to the wear problem discussed above, is torque limitations. More specifically, in order to achieve a watertight seal, the mechanical seal (i.e., the rubber seal ring 44) needs to tightly squeeze the shaft 40. If the seal ring 44 squeezes loosely, then any eccentricity or misalignment of the shaft 40 to the seal 44 will pull the seal 44 away from the shaft 40. This causes water leakage into the dry areas of the housing 26/42, destroying the LED module 10, 56, as discussed above.

In pool cleaner applications, the paddle wheel 32 generates a relatively small amount of torque (e.g., about $1.3*10^{-2}$ foot-pounds). A dynamic seal that squeezes tight enough to form a reliable seal, even if it is made of slippery plastic such as ultra-high-molecular-weight polyethylene (UHMWPE), may exert more resistance than the paddle wheel 32 can overcome. As a result, the paddle wheel 32 wouldn't be able to spin due to the force of the seal 44. On the other hand, a seal loose enough to allow spinning, but also able to hold back water, would still cause substantial friction. That friction-induced torque resistance is a sizable portion of the overall available torque. Thus, the torque used to overcome the dynamic friction of the seal is energy not being used to turn the generator 30. As a result, the dynamic seal reduces the amount of power converted to electricity by the LED module 10, 56.

Figure 11:
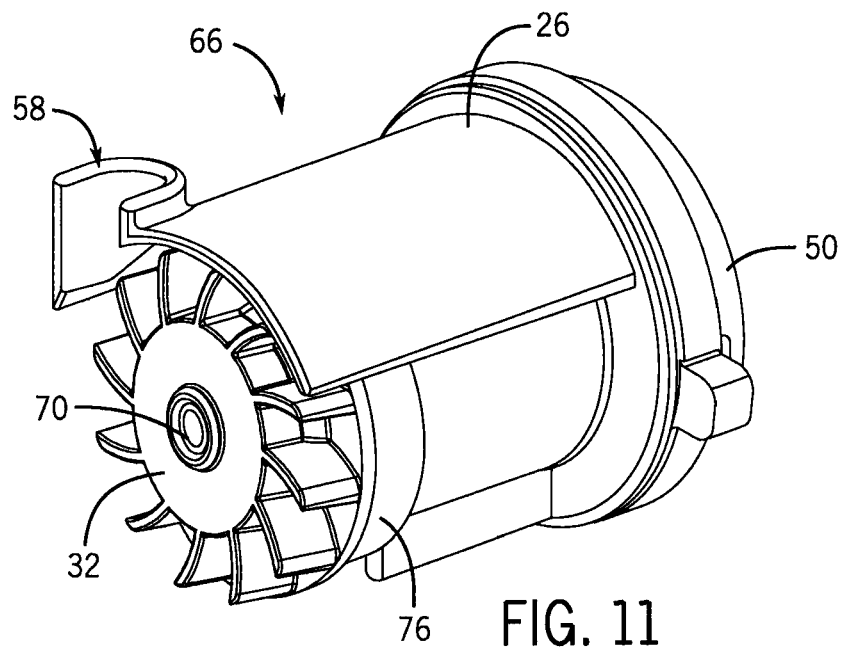
FIG. 11 is a perspective view of a magnetically coupled generator module according to one embodiment of the invention.
Figure 12:
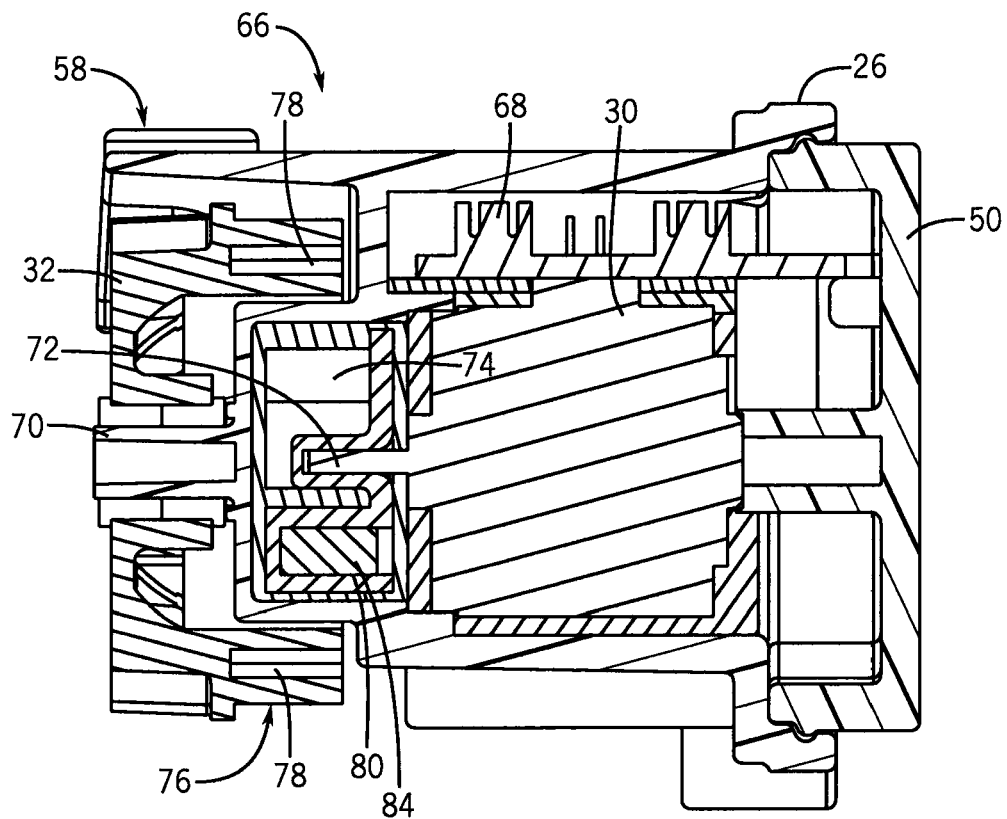
FIG. 12 is a cross-sectional view of the magnetically coupled generator module of FIG. 11.

According to some embodiments of the invention, a magnetically coupled generator module 66, for use with or as a replacement to the LED modules 10, 56 described above or as a stand-alone power generator in a pool cleaner, is shown in FIGS. 11-14. The generator module 66 does not include a dynamic seal design, therefore eliminating the leakage and torque issues described above. As shown in FIGS. 11 and 12, the generator module 66 can include an outer housing 26, a generator 30, a paddle wheel 32, a lead cover 50, a flow director 58, an internal circuit board 68, an external, or drive, shaft 70, an internal, or driven, shaft 72, and a magnetic follower 74.

Figure 13:
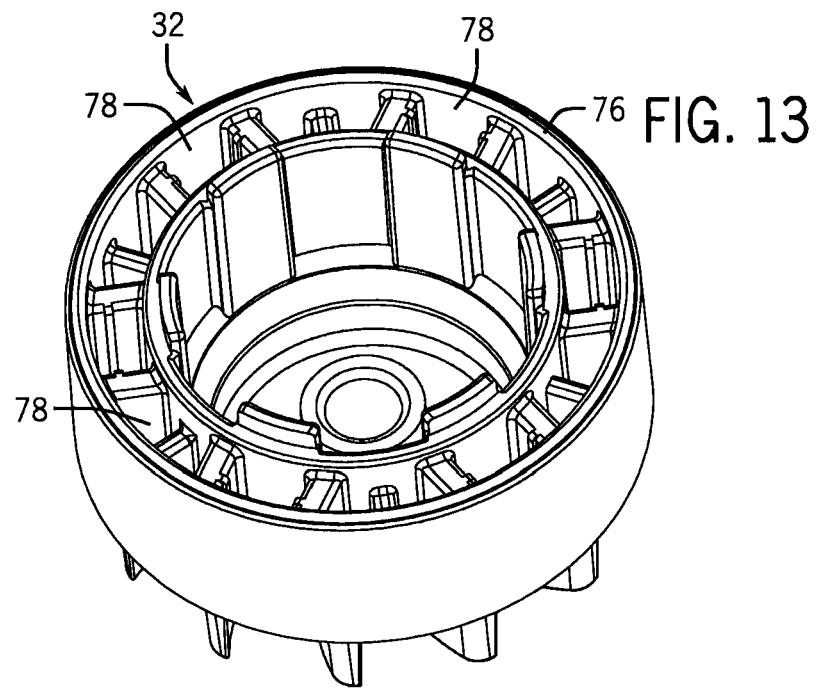
FIG. 13 is a perspective view of a paddle wheel for use with the magnetically coupled generator module of FIG. 11.
Figure 14:
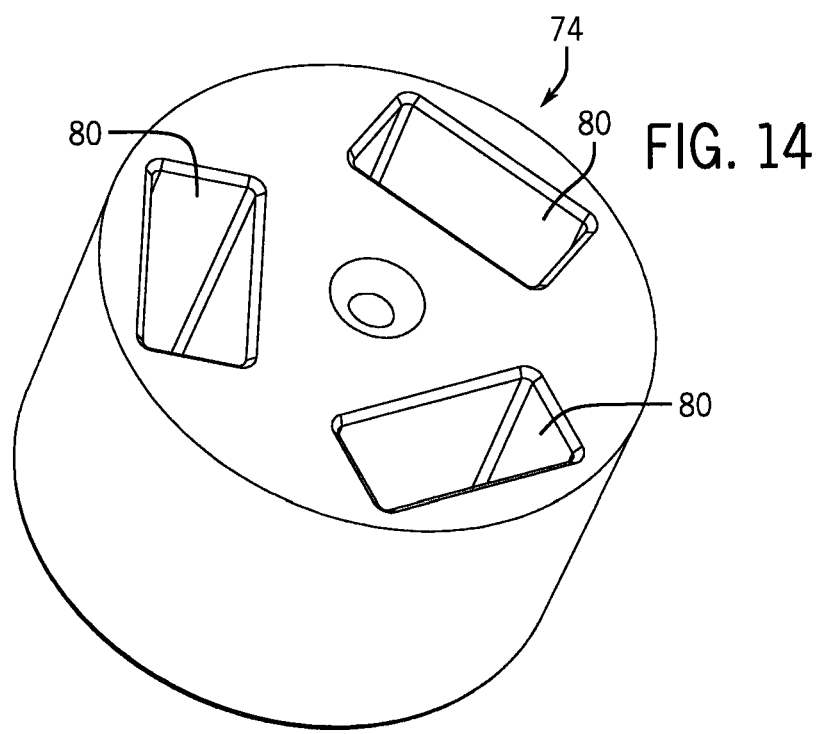
FIG. 14 is a perspective view of a magnetic follower for use with the magnetically coupled generator module of FIG. 11.

The generator module 66 can be positioned within the pool cleaner 12 so that the flow director 58 enters the fluid path of the pool cleaner 12 and receives water flow to redirect to the paddle wheel 32. As shown in FIG. 13, the paddle wheel 32 can include a magnet section 76 with a plurality of holes 78 to each house a drive magnet (not shown) and, as shown in FIG. 14, the magnetic follower 74 can include a plurality of holes 80 to each house a follower magnet 84. The paddle wheel 32 can be positioned over the drive shaft 70 so that the magnet section 76 substantially encircles the magnetic follower 74, which can be positioned around the driven shaft 72 within the outer housing 26. This results in a magnetic coupling between the drive magnets of the paddle wheel 32 and the follower magnets 84 of the magnetic follower 74 so that rotation of the paddle wheel 32 around the drive shaft 70 (which can be stationary) causes rotation of the magnetic follower 74 and the driven shaft 72 (which can rotate with the magnetic follower 74).

The driven shaft 72 is further coupled to the generator 30 so that rotation of the driven shaft 72 causes the generator 30 to produce electric power. Therefore, the generator 30 can generate power from water flow without a direct coupling to the paddle wheel 32 or outside shaft 70, but rather through a magnetic coupling formed between the paddle wheel 32 and the magnetic follower 74. This can eliminate any dynamic seals and, as a result, any leak path risks into the internal housing.

In some embodiments, the generator module 66 can include about nine magnets. The magnetic follower 74 can include three follower magnets 84 with dimensions of about 0.6 cm by about 0.6 cm by about 0.3 cm (for example, grade N42 NdFeB rare earth magnets). The paddle wheel 32 can include six round drive magnets with dimensions of about 0.48 cm diameter by about 0.3 cm height (for example, N42 rare earth magnets). The three follower magnets 84 can be equally spaced relative to each other with their south poles all facing outward, radial to the spin axis of the generator 30. The six drive magnets can be arranged so that three have north poles facing inwards and the other three have south poles facing inwards, arrayed in an alternating pattern. In other embodiments, the generator module 66 can include other amounts of magnets suitable for the size of the generator module 66.

Figure 17:
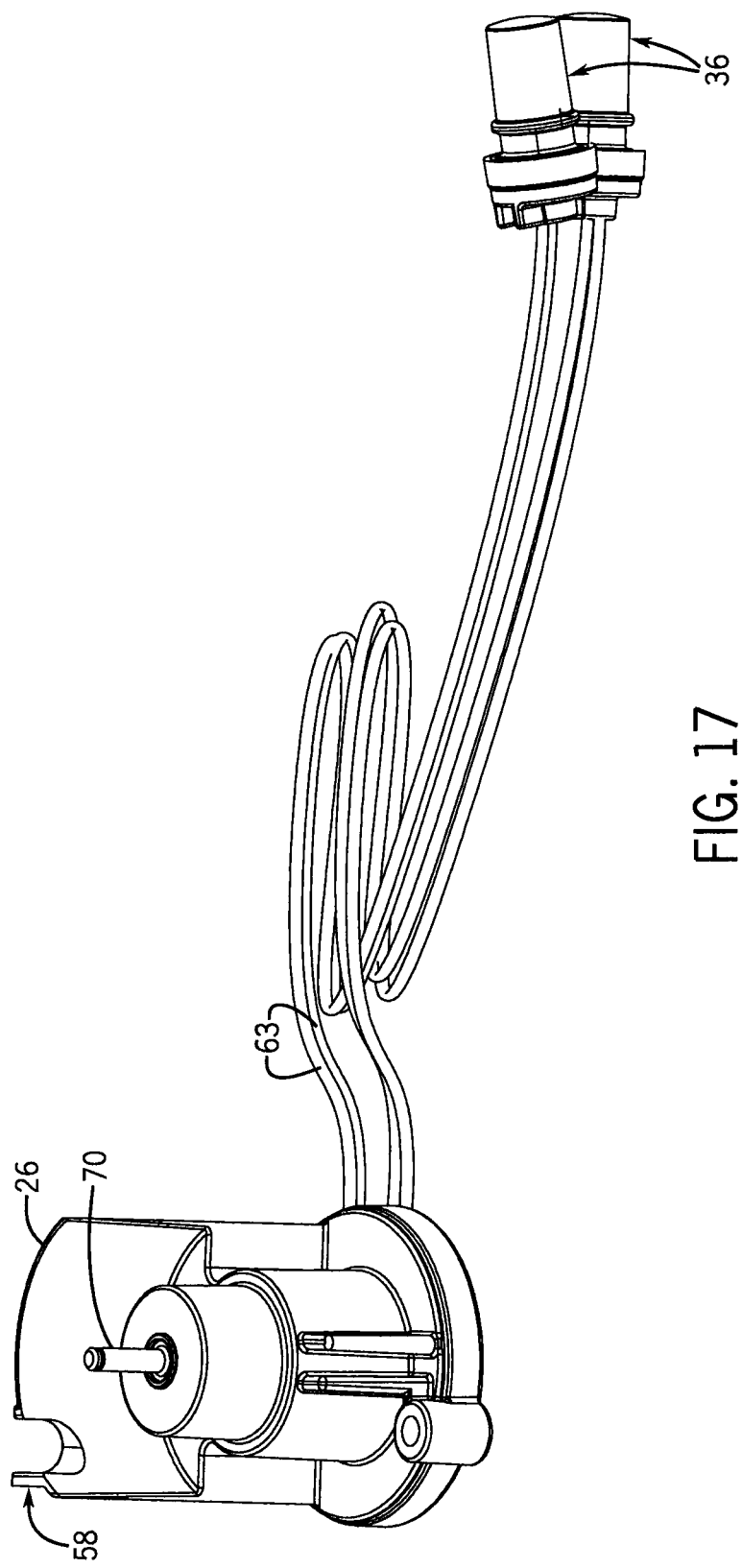
FIG. 17 is a perspective view of a housing for use with the magnetically coupled generator module of FIG. 15.
Figure 19B:
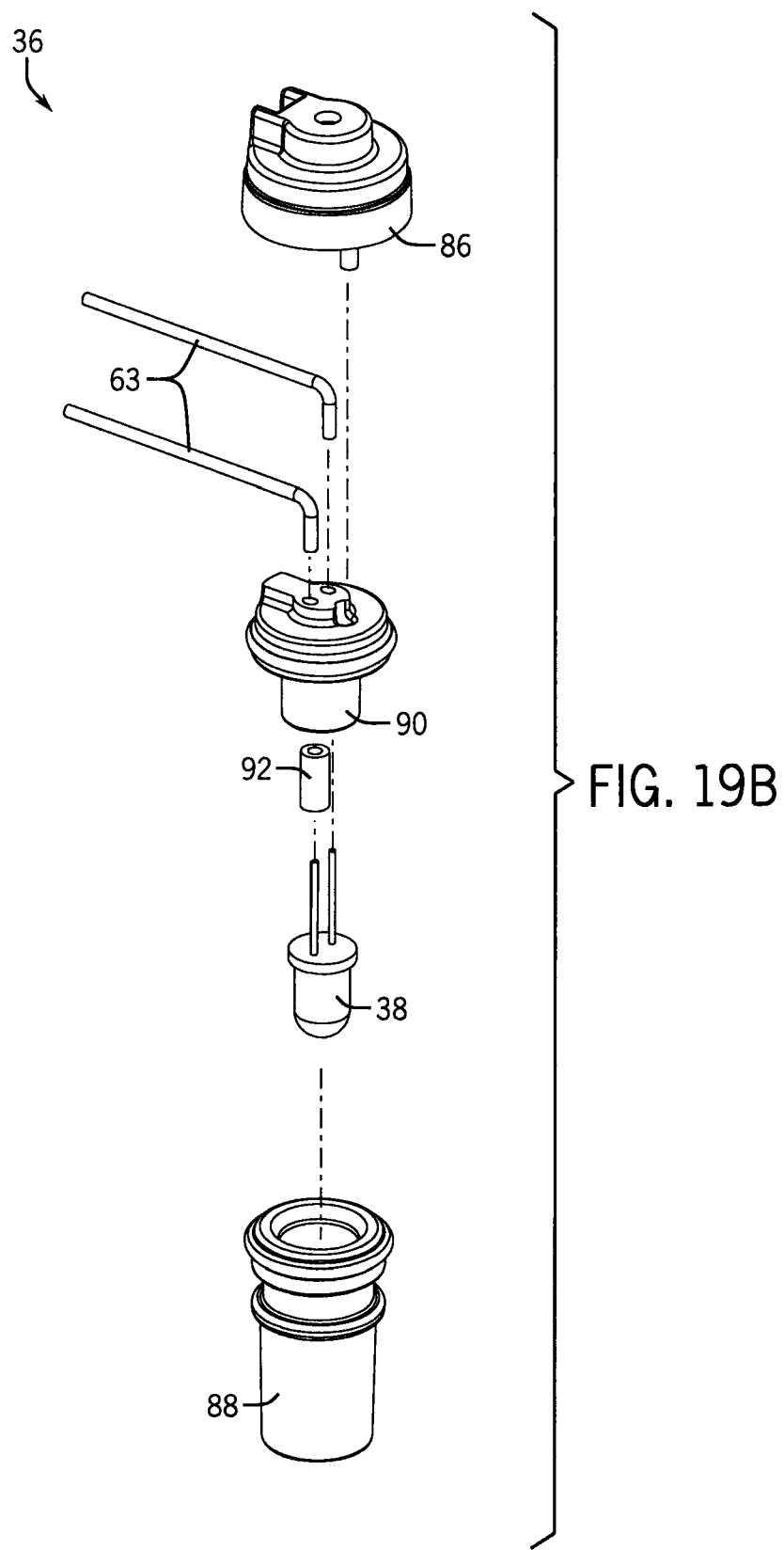
FIG. 19B is an exploded view of an LED housing associated with the magnetically coupled generator of FIG. 19A.

FIGS. 15-19 illustrate the magnetically coupled generator module 66 acting as an LED module, including lead cables 63 that connect to LEDs 38 within LED housings 36. FIG. 15 shows the generator module 66 with the outer housing 26 and the paddle wheel 32 positioned over the drive shaft 70, along with the lead cables 63 and the LED housings 36. FIG. 16 shows the generator 30, the driven shaft 72, and the magnetic follower 74 and FIG. 17 shows the outer housing 26 and the drive shaft 70 along with the lead cables 63 and the LED housings 36. Furthermore, FIGS. 18A-18D show various cross-sectional views of the generator module 66 electrically connected to the LEDs 38, and FIGS. 19A and 19B show an exploded view of the generator module 66 and the LEDs 38 of FIGS. 18A-18D. Specifically, FIGS. 18A-18D and 19A and 19B illustrate the outer housing 26, the generator 30 and connected circuit board 68, the lead cover 50, the magnetic follower 74, follower magnets 84, lead cables 63, and an LED housing 36 including connecting lead cables 63, a cap 86, an LED 38, a lens 88, an epoxy portion 90, and a heat shrink 92. FIGS. 18A-18D and 19A and 19B also illustrate an epoxy portion 94 and an o-ring 96 that can fit within the outer housing 26.

The generator module 66 of FIGS. 15-19 can perform the same functions as the LED modules 10, 56 described above (i.e., powering LEDs 38 and/or other components of the pool cleaner 12) and the various embodiments described with respect to the LED modules are incorporated herein with respect to the generator module. Furthermore, the generator module 66 can eliminate the dynamic seal leakage and torque issues described above with respect to the shaft 40 and rubber seal ring 44 of the LED modules 10, 56. More specifically, by eliminating the wear surface of the seal ring 44, through the use of a magnetic coupling, there is no material that can wear away and cause water leakage, nor is there the friction-induced torque resistance against the generator 30 caused by the seal ring 44. The magnetic coupling can also limit the amount of torque transmitted from the paddle wheel 32 to the generator 30, thereby limiting the amount of power that needs to be handled by the internal circuitry of the generator module 66. More specifically, as the generator 30 spins faster, it generates more power, and the reactive torque of the generator 30 is positively correlated with the amount of power being generated. As more power is generated, more torque is required to maintain the speed. The magnetic coupler has an upper limit on the amount of torque that it can convey. This limit is independent of rotational speed. When the generator 30 spins fast enough to approach a power level, it is also approaching a certain torque level. As long as the generator 30 has a reactive torque lower than the magnetic coupler, the inner and outer magnets (i.e., the follower magnets and the drive magnets, respectively) will stay locked together. When the reactive torque of the generator 30 reaches the torque limit of the magnetic coupler, lock between the inner and outer magnets is lost. The speed of the generator 30 is substantially reduced, while the paddle wheel 32 continues to spin at a high speed.

For example, in an irregular condition, such as when the pool cleaner 12 is taken out of the water but the feedwater through the pool hose 110 is still on, the paddle wheel 32 may spin much faster than a prescribed design speed. If the generator 30 were directly coupled to the paddle wheel 32, the generator 30 would spin quickly as well and would generate a large amount of current. The extra power generated by the generator 30 would then need to be dissipated in the circuitry. However, due to the magnetic coupling, as the generator 30 spins faster, it creates more reactive torque, and when the reactive torque exceeds the maximum strength of the magnetic coupler, it breaks lock. This stops the generator 30 from spinning at the speed of the paddle wheel 32 and generating excessive current. The generator 30 will not regain the lock until the paddle wheel 32 is substantially slowed down. Thus, the magnetic coupler can maintain an upper limit on the amount of power that can be generated by the generator module 66, as well as an upper limit on the amount of excess waste power that would need to be handled by the internal circuitry of the generator module 66. As a result, the circuitry can be designed with a definite upper bound of power that it needs to dissipate in such situations.

In addition, some embodiments can include a generator module (not shown) that does not use the direct coupling or the magnetic coupling described above. Instead, the paddle wheel can include embedded magnets (as described above with respect to the magnetic coupling), and an array of coils can be situated around the paddle wheel. The array of coils can observe an alternating magnetic field as the paddle wheel spins, and the alternating magnetic field can then be converted to an alternating electric current to drive circuitry of the generator module, such as circuitry for LEDs. This design can be more reliable than the direct coupling and the magnetic coupling described above due to having fewer moving parts, and would not require a dynamic seal (therefore eliminating leakage issues).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed. For example, it should be appreciated that any of the design aspects discussed herein relating to one specific embodiment may be utilized in any other embodiment (e.g., design aspects discussed with respect to a directly coupled system may be incorporated into a magnetically coupled system).

The invention claimed is:

1. A method of operating a pool cleaner, the method comprising the steps of:
receiving fluid flow through an opening in the pool cleaner;
generating electric power using a paddle wheel positioned to receive at least some of the fluid flow and a generator magnetically coupled to the paddle wheel;
determining a pressure of the fluid flow;
operating at least one light emitting diode using the generated electric power according to a first operation if the pressure is sufficient for normal operation of the pool cleaner; and
operating the at least one light emitting diode using the generated electric power according to a second operation if the pressure is insufficient for normal operation of the pool cleaner.

2. The method of claim 1, wherein the first operation includes operating the at least one light emitting diode to emit a first color and the second operation includes operating the at least one light emitting diode to emit a second color different than the first color.

3. The method of claim 1, wherein the first operation includes operating the at least one light emitting diode to emit a constantly visible light and the second operation includes operating the at least one light emitting diode to emit a flashing light.

4. The method of claim 1, wherein the pool cleaner further includes a generator module.

5. The method of claim 4, wherein the generator module comprises an outer housing, the paddle wheel, the generator, and a magnetic follower.

6. The method of claim 5, wherein the generator module further comprises a circuit board.

7. The method of claim 5, wherein the generator module further includes a device for converting an alternating magnetic field into an alternating electric current.

8. The method of claim 7, wherein the generator module further includes electronic circuitry that is driven by the alternating electric current.

9. The method of claim 8, wherein the at least one light emitting diode receives power from the alternating electric current and illuminates an area adjacent to the pool cleaner.

10. The method of claim 1, wherein the generator is positioned inside an outer housing and is in communication with a driven shaft.

11. The method of claim 10, wherein the outer housing is disposed between a supply mast of the pool cleaner and a pool hose attachment adapter.

12. The method of claim 11, wherein the outer housing is coupled to the supply mast by a snap fit connection and the outer housing is coupled to the pool hose attachment adapter by a friction fit connection.

13. The method of claim 1, wherein the generator is in communication with a driven shaft.

14. The method of claim 1, wherein the paddle wheel includes a magnet section having at least one drive magnet and rotating in response to the fluid flow through a fluid path.

15. The method of claim 1, wherein the paddle wheel is positioned around a drive shaft.

16. The method of claim 1, wherein the paddle wheel is located within a paddle wheel housing, which is removably coupled to a generator housing.

17. The method of claim 1, wherein the paddle wheel includes magnets embedded into the paddle wheel.

18. The method of claim 1, wherein an array of coils are situated around the paddle wheel.

19. The method of claim 18, wherein the array of coils are configured to be exposed to an alternating magnetic field when the paddle wheel rotates.

20. The method of claim 1, wherein the at least one light emitting diode is connected to the generator using at least one lead cable.

21. The method of claim 1, wherein the at least one light emitting diode includes control circuitry that controls at least one of illumination and color of the at least one light emitting diode.

* * * * *